United States Patent
Lin et al.

(10) Patent No.: US 9,258,366 B2
(45) Date of Patent: Feb. 9, 2016

(54) REMOTE MANAGEMENT SYSTEM AND OPERATING METHOD THEREOF

(75) Inventors: Sheng-Peng Lin, Delta (CA); Yi-Li Liu, Delta (CA)

(73) Assignee: ATEN INTERNATIONAL CO., LTD., Shijr (TW)

( * ) Notice: Subject to any disclaimer, the term of this patent is extended or adjusted under 35 U.S.C. 154(b) by 281 days.

(21) Appl. No.: 13/348,646

(22) Filed: Jan. 12, 2012

(65) Prior Publication Data

US 2013/0159391 A1    Jun. 20, 2013

(51) Int. Cl.
| | |
|---|---|
| G06F 15/16 | (2006.01) |
| H04L 29/08 | (2006.01) |
| H04L 12/24 | (2006.01) |
| G08B 13/196 | (2006.01) |

(52) U.S. Cl.
CPC .............. H04L 67/125 (2013.01); H04L 41/22 (2013.01); *G08B 13/19682* (2013.01); *G09G 2370/24* (2013.01)

(58) Field of Classification Search
CPC .............. H04L 41/22; H04L 29/08567; H04L 29/08099; H04L 67/125; H04N 5/44582; G09G 2370/24; G08B 13/19682
USPC ........................................................ 709/203
See application file for complete search history.

(56) References Cited

U.S. PATENT DOCUMENTS

| | | | |
|---|---|---|---|
| 2005/0043025 A1 | 2/2005 | Durand | |
| 2006/0075106 A1* | 4/2006 | Hochmuth et al. | 709/227 |
| 2007/0074179 A1* | 3/2007 | Kwan | 717/136 |
| 2007/0094426 A1 | 4/2007 | Chiang et al. | |
| 2007/0124792 A1 | 5/2007 | Bennett et al. | |
| 2007/0150818 A1 | 6/2007 | Liu | |
| 2008/0163039 A1* | 7/2008 | Ryan et al. | 715/206 |
| 2010/0060571 A1* | 3/2010 | Chen et al. | 345/157 |
| 2011/0208963 A1* | 8/2011 | Soffer | 713/168 |
| 2012/0030394 A1* | 2/2012 | Bird | 710/305 |

(Continued)

FOREIGN PATENT DOCUMENTS

| | | |
|---|---|---|
| CN | 1585443 A | 2/2005 |
| CN | 1972212 A | 5/2007 |
| CN | 1991710 A | 7/2007 |

OTHER PUBLICATIONS

"KVM Over the Net User Manual" pp. 1-236; Pub. Date: 2009.*

(Continued)

*Primary Examiner* — Krista Zele
*Assistant Examiner* — James Forman
(74) *Attorney, Agent, or Firm* — Chen Yoshimura LLP

(57) ABSTRACT

A remote management system includes a remote management apparatus and a user interface. The remote management apparatus has an network interface, a computer interface, and a console interface. The network interface is coupled to a first computer via a network. The computer interface is a signal transmitting interface between the remote management apparatus and a second computer. The user interface corresponds to a set of cursor control device and monitor. The user interface provides a plurality of functional options corresponding to a plurality of functions managing the remote management apparatus respectively. The user interface also shows a plurality of steps on the screen needed for the user to perform the function corresponding to the functional option on the remote management apparatus in response to one of functional options selected by the user to guide the user to finish the function interactively.

8 Claims, 9 Drawing Sheets

(56) References Cited

U.S. PATENT DOCUMENTS

2012/0154375 A1* 6/2012 Zhang et al. .................. 345/419
2012/0166642 A1* 6/2012 Saint Clair et al. ........... 709/225

OTHER PUBLICATIONS

Chinese Office Action, dated Mar. 27, 2014, in a counterpart Chinese patent application, No. CN 201110453536.5.

* cited by examiner

REMOTE MANAGEMENT SYSTEM AND OPERATING METHOD THEREOF

BACKGROUND OF THE INVENTION

1. Field of the Invention

This invention relates to a remote management system and method, and in particular, it relates to a remote management system and method that provides an operation guide wizard to assist users to complete operating instruction of specific functions on remote computers and also provides users with homonyms and synonyms search functions.

2. Description of the Related Art

Keyboard-video-mouse (KVM) switches are connected between a user end control console and multiple controlled computers, so that a user may use one set of keyboard, monitor ad mouse to control multiple controlled computers. Over-IP KVM switches, also known as IP-based KVM switches, are a type of KVM switches that have a network interface for users of desktop or laptop computers to control remote computers through computer networks. In addition, over-IP serial-interface management apparatus and power management apparatus also allow desktop or laptop computer users to manage multiple remote serial devices or power supplies of the controlled remote computers.

The above described over-IP KVM switches, over-IP serial-interface management devices and over-IP power management devices all have different properties (hereinafter collectively referred to as "over-IP apparatus"), so they all have their own management interface programs, and users must switch between them to select different types of over-IP apparatus. For example, when a user is operating through an over-IP KVM, if the user wants to control the power supply of the computer controlled by the over-IP KVM, the user must switch to the management interface program of the over-IP power management apparatus. This is often inconvenient in remote management operation.

To solve these problems, recently a remote management apparatus known as "control center" or "command center" has been developed to combine the management interface programs of the three different over-IP apparatus into a single management interface program. An example of such remote power management apparatus is a model number CC2000 control center provided by ATEN International Inc. of Taiwan. The management interface of CC2000 can simultaneously manage all three different types of remote over-IP apparatus.

Referring to FIG. 1, which illustrates a user end first computer 1 connected through network 2 to an above described control center 3A to control multiple over-IP apparatus 3 and also indirectly visit and control the computers 4a-4c controlled by the multiple over-IP apparatus 3. As shown in FIG. 1, the user end first computer 1 is coupled through network 2 to control center 3A (e.g., CC2000), and through the control center 3A to control multiple over-IP apparatus 3, so the user of the first computer can visit and control multiple remote second computers 4a-4c through over-IP apparatus 3. The monitor of the user end first computer 1 will display the image of the console interface of the remote second computers 4a-4c for the control operations by the user.

However, the number of over-IP apparatus managed by such a remote management apparatus can be over one thousand, which forms a huge and complicated remote management system. For an ordinary user who has not studied in detail the operation guides of the remote management system and the over-IP apparatus, it is hard to understand how to manage the complicated remote management system and utilize the complicated functions of the over-IP apparatus, such as the system configuration set up, backup and restore functions. Moreover, the newer generation over-IP apparatus come with more diverse and complicated functions. Users, particularly novice users, need to spend a lot of time and efforts to memorize the operation process steps of each function before they can comfortably operate and control the remote management systems and over-IP apparatus. For ordinary users this is very inconvenient.

SUMMARY OF THE INVENTION

The following summary extracts and compiles some of the features of the present invention, while other features will be disclosed in the follow-up detailed descriptions of the invention. It is intended to cover various modifications and similar arrangements included within the spirit and scope of the appended claims.

It is one of the objects of the present invention to provide a remote management system and operating method thereof to solve the aforementioned problems of existing technologies.

In one embodiment the present invention provides a remote management system capable of coupling a first computer to at least one second computer through a network such that the first computer can operate the at least one second computer, comprising: (a) a remote management apparatus having a network interface for coupling to the first computer through the network, a computer interface for signal transmission between the remote management apparatus and the at least one second computer, and an console interface for coupling to a group of cursor control device and a display screen; and (b) a user interface for providing a plurality of function selection options that correspond respectively to a plurality of functions of the remote management apparatus, and in response to a user selection of an option of the function selection options, the user interface further providing a plurality of operating steps to be executed on the remote management apparatus for performing a specific function that corresponds to the user selected option, to guide the user to complete the specific function.

In practical implementations of the present invention remote management system, the plurality of functions are selected from a group comprising a computer configuration backup function, a computer configuration restore function, a computer configuration increase function, a computer direct read/write function, a computer firmware upgrade function, a user right administration function, a user template increase function, a synchronization function, a computer connection port initialization function, and a computer connection port correction function.

In addition, the remote management apparatus will also at least includes an on-screen display (OSD) module for providing the user interface on the display screen.

In another embodiment the present invention provides a method for operating a remote management system, the remote management system capable of coupling a first computer to at least one second computer through a network, such that the first computer can operate the at least one second computer, and having a network interface for coupling to the first computer through the network, a computer interface for signal transmission between the remote management apparatus and the at least one second computer, and an console interface for coupling to a group of cursor control device and a display screen, the method comprising the steps of: (a) providing a plurality of function selection options that correspond respectively to a plurality of functions of the remote management apparatus; (b) in response to a user selection of an option of the function selection options, providing a plurality of operating steps to be executed on the remote management apparatus for performing a specific function that corresponds to the user selected option, and (c) guiding the user to execute the operating steps to complete the specific function.

In practical implementations of the present invention method for operating a remote management system, the plurality of functions are selected from a group comprising a computer configuration backup function, a computer configuration restore function, a computer configuration increase function, a computer direct read/write function, a computer firmware upgrade function, a user right administration function, a user template increase function, a synchronization function, a computer connection port initialization function, and a computer connection port correction function.

In addition, the remote management apparatus further comprises an on-screen display (OSD) module, and the method further comprises the step of providing the user interface on the display screen by the OSD module.

In a further embodiment the present invention provides a keyboard-video-mouse (KVM) switch capable of coupling a group of cursor control devices and a display screen to at least one computer through a network such that a user can manage the KVM switch and operate the at least one computer through the group of cursor control devices or the display screen, comprising: (a) a computer interface for signal transmission between the KVM switch and the at least one computer; (b) an console interface for coupling to the group of cursor control device and the display screen; and (c) a user interface for providing a plurality of function selection options that correspond respectively to a plurality of functions of the KVM switch, and in response to a user selection of an option of the function selection options, the user interface further providing a plurality of operating steps to be executed on the KVM switch for performing a specific function that corresponds to the user selected option.

In practical implementations of the present invention KVM switch, the plurality of functions are selected from a group comprising a computer configuration backup function, a computer configuration restore function, a computer configuration increase function, a computer direct read/write function, a computer firmware upgrade function, a user right administration function, a user template increase function, a synchronization function, a computer connection port initialization function, and a computer connection port correction function.

In addition, the KVM switch will also at least includes an on-screen display (OSD) module for providing the user interface on the display screen.

The remote management system and operating method thereof according to the present invention are advantageous over existing technologies. It allows users to complete operating instruction of a specific function of remote computers. A user only needs to select a function to be performed from a function list, or input a keyword of the function to be performed in an input window, to complete the operation of the selected function. In addition, the present invention remote management system provides a synonyms or homonyms search function, so that when a user is unsure about the name or code of a specific function, the user only needs to input a synonyms or homonyms of the function name. This is very convenient to the users.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as other alternative embodiments) of the present invention.

One preferred embodiment of the present invention provides a remote management system. The remote management system has an application program and a remote management apparatus which can couple a first computer to at least one second computer through a network, such that the first computer can manage the remote management apparatus and operate the at least one second computer. For example, the first computer may be a user end electronic device, the second computer may be a remote computer device, and the remote management apparatus may be an over-IP KVM, serial interface management apparatus or environment monitoring and control apparatus. The first computer can be coupled to the remote management apparatus through a network to visit or control the at least one second computer.

In fact, the first computer can be any hand-held electronic devices that can execute software programs, such as mobile phone, personal digital assistant (PDA), global positioning system (GPS) device, etc. The at least one second computer can be any computer equipment, such as any types of servers, desktop computers or laptop computers. It is noted that the types and quantities of the remote management apparatus, first computer and second computer are not limited to the examples described above.

Figure 1:
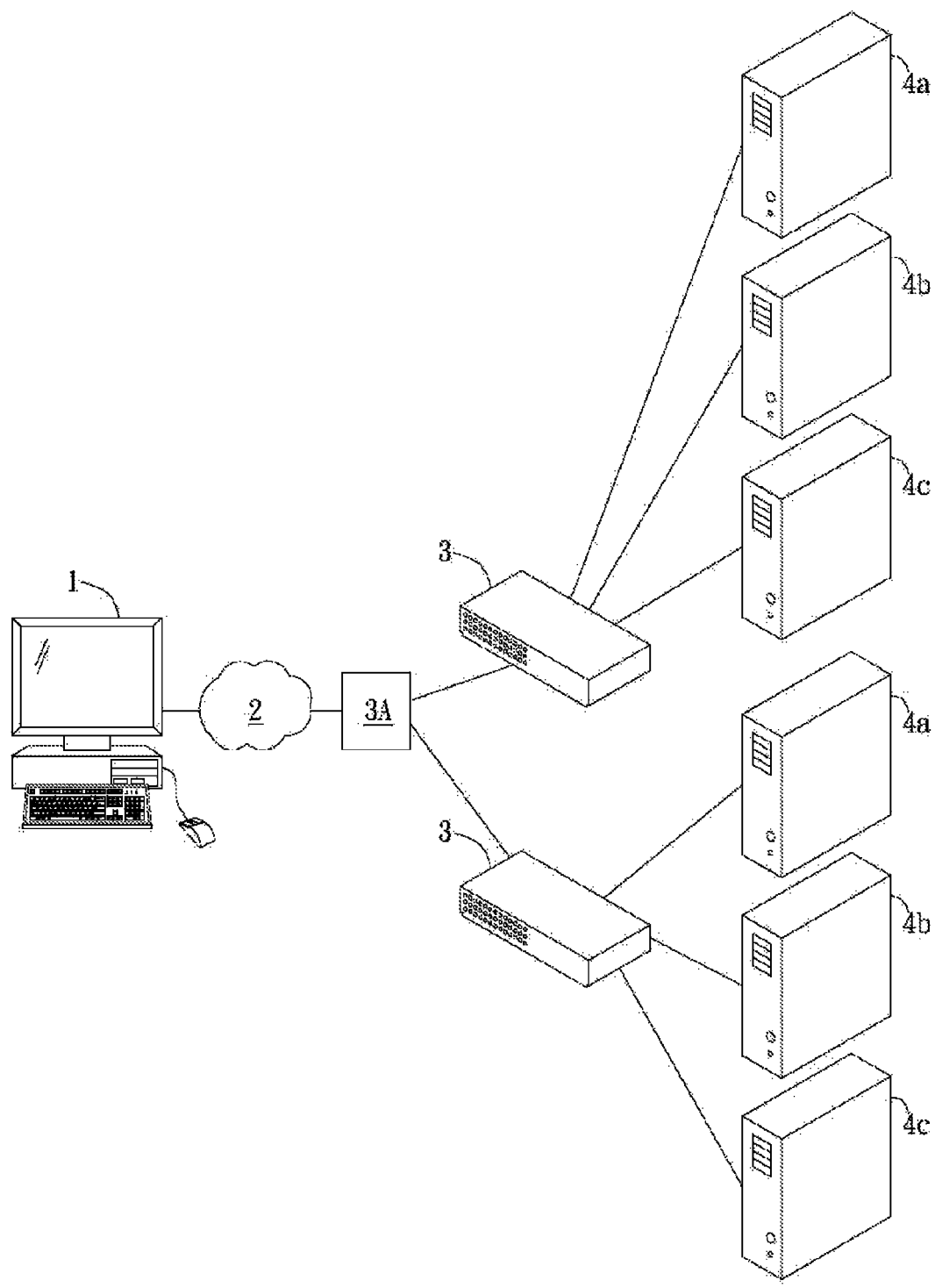
FIG. 1 is a diagram illustrating a first computer connected to a control center to manage multiple over-IP apparatus and indirectly visit and control the computers controlled by the over-IP apparatus.
Figure 2A:
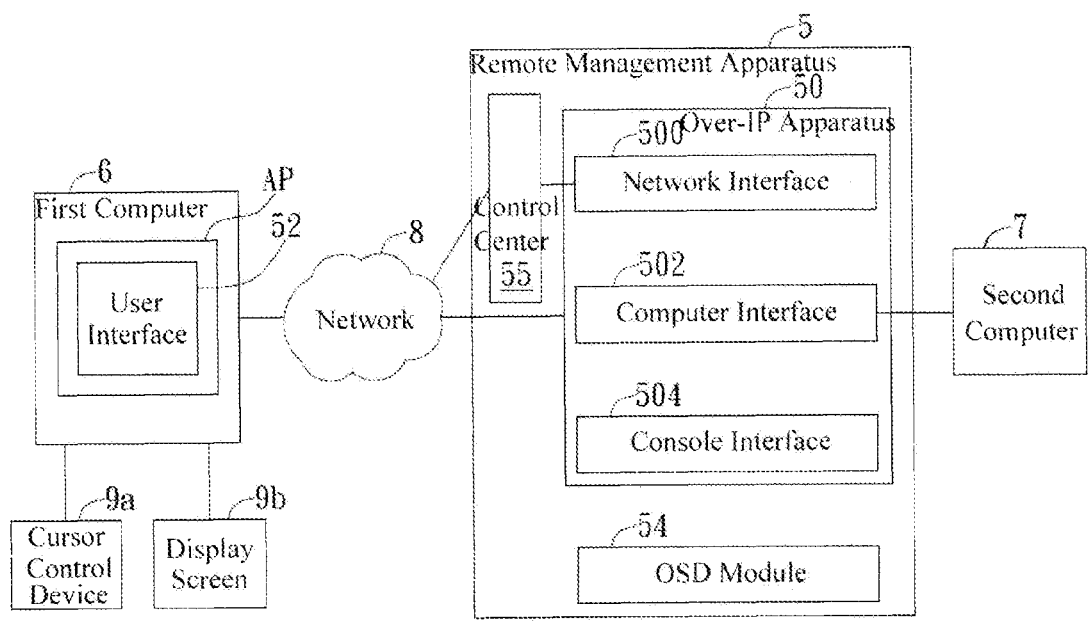
FIG. 2A is a block diagram illustrating the functional blocks of one embodiment of the present invention remote management system.

Referring to FIG. 2A, there is shown a block diagram illustrating the functional blocks of the preferred embodiment of the present invention remote management system. As described above, the remote management system has an application program AP and a remote management apparatus 5. Remote management apparatus 5 further includes a control center 55 and one or more over-IP apparatus 50. Remote management apparatus 5 couples a first computer 6 to at least one second compute 7 through network 8. The first computer has a cursor control device 9a and a display screen 9b. In this embodiment, the application program AP is executed on the first computer 6 at the user end, to cause the first computer 6 to communicate with the remote management apparatus 6 through network protocol, and to cause the first computer 6 to convert control signals it receives from the cursor control device 9a (e.g., keyboard and/or mouse) into network signals. On the other hand, the application program AP also causes the first computer 6 to convert network signals it receives from the remote management apparatus 5 into computer readable video signals so they can be displayed by the first computer 6 on its display screen 9b. The remote management apparatus 5 will collect the video signals outputted by the at least one second computer 7 (i.e., the desktop image of the at least one second computer 7 itself) in response to the control signals of the first computer 6, convert them into network signals, and outputting the converted signals to the first computer 6 through network 8. The application program AP executed on the first computer 6 then generate a display window on the first computer 6 in response to the network signals, so that a user can control and operate the remote at least second computer 7 through the display window on the first computer 6. This makes the user of the first computer 6 to feel that he or she is directly operating on and controlling the at least one second computer 7.

As shown in FIG. 2A, the remote management apparatus 5 is used to connect the first computer 6 to the second computer 7 through network 8, such that the first computer can manage the remote management apparatus 5 and the second computer 7. In fact, the number of the second computer 7 may be one or more, and is not limited by this example. Remote management 5 includes a control center 55 and at least one over-IP apparatus 50 (the control center 55 and the over-IP apparatus are hereinafter collectively referred to as remote management apparatus 5). In this embodiment, over-IP apparatus 50 has a network interface 500, a computer interface 502, and an console interface 504. The remote management apparatus 5 also has an on-screen-display (OSD) module 54. The remote management apparatus 5 can receive the video image signal from second computer 7 and transmitting processed signals to the first computer 6 through network 8. The remote management apparatus 5 also convert the mouse or keyboard control signals from the first computer 6 through network 8 into a format readable by the second computer 7. Here, the over-IP apparatus 50 may be an over-IP KVM, over-IP serial-interface management apparatus, or over-IP power management apparatus or any combination thereof. Multiple over-IP apparatus 50 may be simultaneously controlled through the control center 55. In practical implementations, the user of the first computer may understand, through a tree-scheme provided by the control center 55, the architecture of the entire remote management system, such as the number of over-IP KVMs, their name and the respectively controlled computers.

Now the functions of the various interfaces of the over-IP apparatus 50 will be introduced. In the over-IP apparatus 50, the network interface 500 is used for coupling the first computer 6 through network 8, computer interface 502 is used for transmitting signals between the over-IP apparatus 50 and the second computer 7, and the console interface 504 is used for a group of cursor control device 9a and display screen 9b.

In practical implementations, the network 8 may be the Internet, a local area network (LAN), a wide area network (WAN), an integrated services digital network (ISDN), an asynchronous transfer mode (ATM) network, or other types of network, without limitation. The network interface 500 can be a network interface corresponding to any of the above different types of network. The computer interface 502 can be any signal transmitting interface capable of signal transmission between electronic devices, such as the universal serial bus (USB) interface, the IEEE 1394 interface, an IEEE 802.11p interface, a video graphic array (VGA) interface, a digital visual interface (DVI), or a high-definition multimedia interface (HDMI), but is not limited to the above examples. The video signals from the second computer 7 are output to remote management apparatus 50 through the computer interface 502, and the control signals from the cursor control device 9a of first computer 6 are input to the remote management apparatus 50 through the computer interface 502.

In this embodiment, user interface 52 is provided by an application program executed on the first computer 6. The application program may be a web-page browser. The user interface 52 provides multiple function selections, which correspond respectively to the functions of the over-IP apparatus 50. In response to the function selected by the user, the user interface 52 further allows the user to carry out the corresponding steps of the selected function to be performed by the over-IP apparatus 50.

In practical implementations, the user interface 52 may be provided in many ways. For example, the OSD module 52 of the remote management apparatus 5 may provide the user interface 52 on screen display 9b. Alternatively over-IP apparatus 50 may also use hyper-text markup language (HTML) or Java Script or other language to interact with the first computer 6 to provide the user interface 52 on the first computer 6.

Figure 2B:
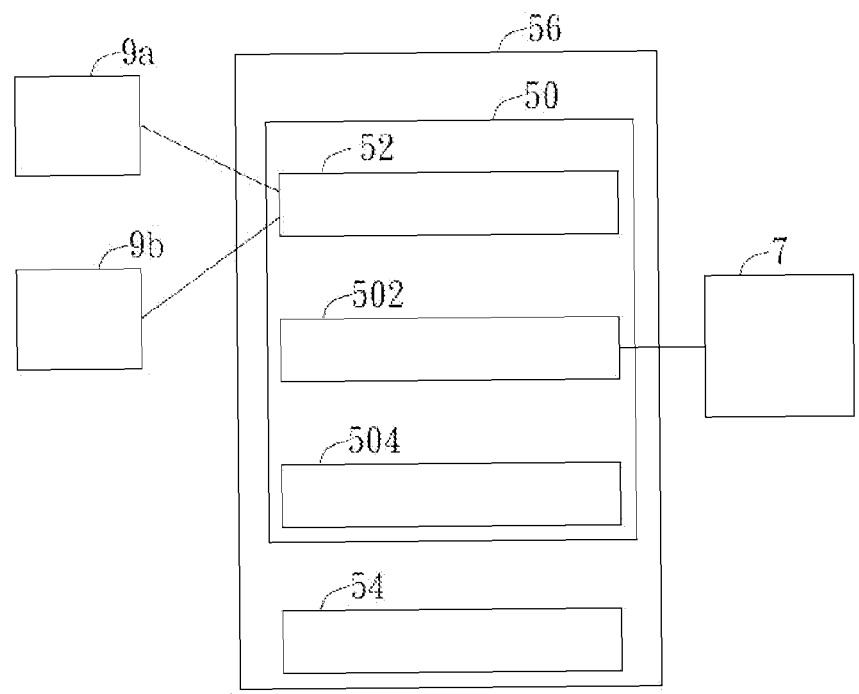
FIG. 2B is a block diagram illustrating the functional blocks of another embodiment of the present invention remote management system.

Referring to FIG. 2B, there is shown a block diagram illustrating the functional blocks of another embodiment of the present invention remote management system. The user uses a group of cursor control devices 9a and screen 9b to manage a KVM switch 56 and control at least one second computer 7. The main difference between KVM 56 shown here and the over-IP apparatus shown in the above described FIG. 2A is that KVM switch 56 has no network interface. So the cursor control devices 9a and screen 9b are directly connected to KVM switch 56 without going through a network or a first computer. The KVM switch 56 also has user interface 52, computer interface 502, console interface 504 and OSD module 54 with similar functions as described above. Another difference from the embodiment shown in FIG. 2A is that the user interface 52 here is provided by the hardware of or software running on KVM switch 56.

Figure 2C:
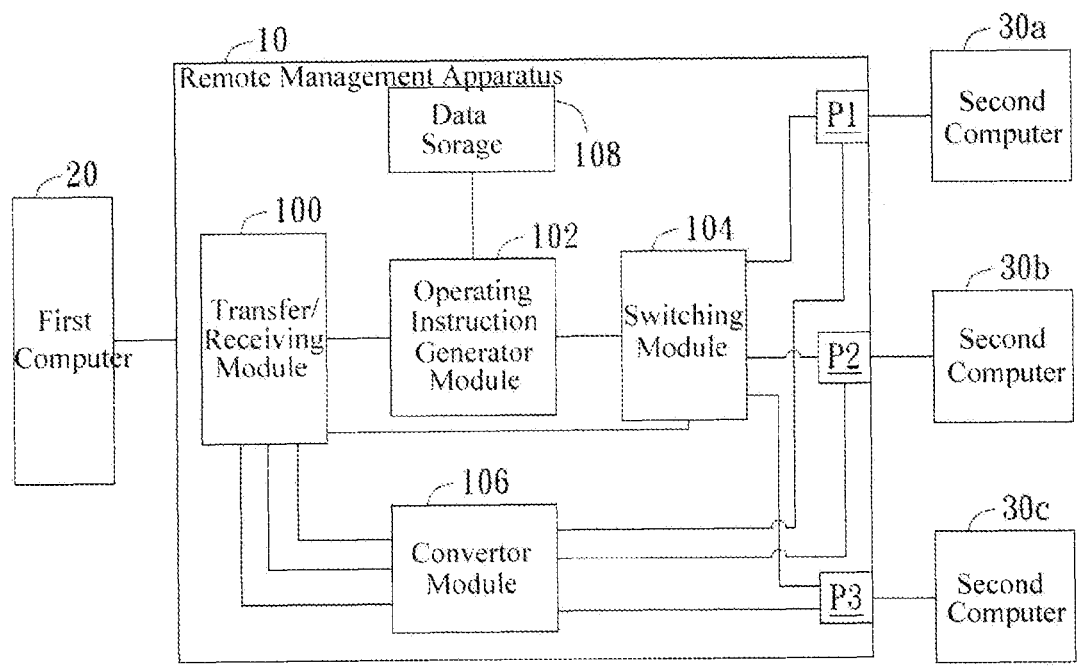
FIG. 2C is a block diagram illustrating the functional blocks of still another embodiment of the present invention remote management system.

Next, an example on how the user end first computer can switch the remote second computer through the remote management apparatus of the present invention will be described. Referring to FIG. 2C, a remote management apparatus 10 is coupled between a user end first computer 20 and multiple remote second computers 30a-30c. The remote management apparatus 10 has a transmitting/receiving module 100, an operating instruction generator module 102, a switching module 104, a convertor module 106, a data storage 108 and multiple connection ports P1-P3. The transmitting/receiving module 100 is respectively coupled with the operating instruction generator module 102, the switching module 104 and convertor module 106. The operating instruction generator module 102 is coupled to the switching module 104. The switching module 104 is selectively coupled to the connection ports P1-P3, which are in turn coupled to the convertor module 106. The data storage 108 is coupled with the operating instruction generator module 102.

In this practical implementation, a user can use the user end first computer 20 through the switching operation of the remote management apparatus 10 to control different second computers 30a, 30b and 30c. Described more in more details, the user can use the user end first computer to send control signals to remote management apparatus 10, for example the control signals may contain a switching command to cause the remote management apparatus 10 to switch to second computer 30a, 30b or 30c. When the transmitting/receiving module 100 of the remote management apparatus 10 receives the switching command, the transmitting/receiving module will immediately forward the switching command to switching module 104, which will act in accordance with the switching command to switch to connection port P1, P2 or P3 for connection with corresponding second computer 30a, 30b or 30c respectively.

Assuming that the switching module 104 switches to connection port P1 for connection to second computer 30a, then the remote management apparatus 10 can receive a first image from the second computer 30a through the connection port P1 (which represents a desktop image of the second computer 30a), and after converting the first image to a first image signal (e.g. using JPEG coding to convert it into multiple still images) by the convertor module 106, transmit the first image signal by the transmitting/receiving module 100 to the first computer 20, such that the first computer 20 now displays still images representing the desktop image output of the second computer 30a. Similarly, if the switching module 104 switches to connection port P2 for connection to second computer 30b, then the remote management apparatus 10 can receive a second image from the second computer 30b through the connection port P2 (which represents a desktop image of the second computer 30b), and after converting the second image to a second image signal by the convertor module 106, transmit the second image signal by the transmitting/receiving module 100 to the first computer 20, such that the first computer 20 now displays still images representing the desktop image output of the second computer 30b. As the situation where switching module switches to connection port P3 for connection to second computer 30c, the description of subsequent operations is similar to the above description so it will not be repeated.

After describing how to switch the remote second computer through remote management apparatus 10, next the generation of operating instructions through the remote management apparatus 10 will be described. In the embodiment shown in FIG. 2A, the user is using the first computer 20 to generate user instructions and transmit the instructions to the remote management apparatus 10 through the network. In the embodiment shown in FIG. 2B, the user is using the group of cursor control devices to generate user instructions and transmit the instructions to the remote management apparatus 10. The user instructions are corresponding to the functions of the remote management apparatus 10 for controlling the second computers 30a-30c. There is no limitation to the types of such control functions, for example they can be configuration backup function, configuration restoration function, configuration increase function, direct read/write function, firmware upgrade function, user right administration function, synchronization function, connection port correction function, user template increase function, computer connection port initialization function, and/or other similar functions.

When the transmitting/receiving module 100 of the remote management apparatus 10 receives user instructions from the first computer 20 or the cursor control devices described above, the transmitting/receiving module will forward the user instructions to the operating instruction generator module 102. In response to the user instructions, the operating instruction module 102 will generate operating instructions to perform the specific function that corresponds with the user instructions. In the embodiment shown in FIG. 2A, the generated operating instructions will be transmitted by the transmitting/receiving module 100 to the first computer 20, to display an operating instruction menu on the first computer 20. In the embodiment shown in FIG. 2B, the generated operating instructions will be transmitted by the transmitting/receiving module 100 to a screen which may be a touchscreen, to display an operating instruction menu on the screen.

In practical implementations, operating instruction generator module 102 may retrieve and/or store (read/write) needed operating instruction data from/to the data storage 108. In addition, because the respective functions of second computers 30a, 30b and 30b may be different, when the switching module switches remote second computer, the operating instruction generator module 102 needs to be informed so that it can generate operating instructions that correspond to the correct remote computer.

Figure 3:
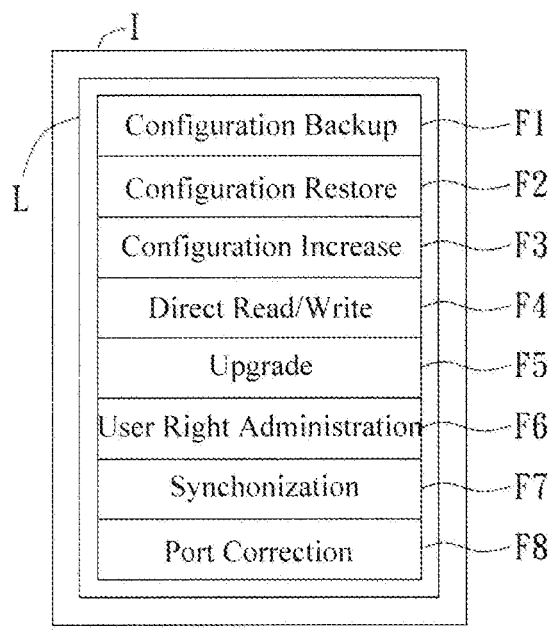
FIG. 3 is a diagram illustrating an operating instruction display, listing multiple functions to be selected, shown on the user interface of the remote management system.

Referring to FIG. 3, there is shown an operating instruction image for displaying multiple functions to be selected, displayed on the user interface of the remote management system. As shown in FIG. 3, operating instruction image I includes a function list L of all functions as options F1-F8. These options F1-F8 correspond to the following functions respectively: F1 represents the computer configuration backup function, F2 represents the computer configuration restore function, F3 represents the configuration increase function, F4 represents the direct read/write function, F5 represents the computer firmware upgrade function, F6 represents the user right administration function, F7 represents the synchronization function, and F8 represents the connection port correction function. It is noted that these functions are provided as examples not limitation. Other possible functions may include user template increase function, computer connection port initialization function, etc.

Referring to FIGS. 2C and 3 together, assuming a user selects a configuration backup function by using a touchscreen or a mouse, the first computer will send the user instruction containing selection of the backup function to remote management apparatus 10. When the transmitting/receiving module 100 of the remote management apparatus 10 receives this user instruction, the transmitting/receiving module 100 will forward the user instruction to operating instruction generator module 102. Then the operating instruction module 102 will generate operating instructions in response to the user instruction. The operating instructions will include multiple steps K1-K5 for performing and completing the configuration backup function, where K1 represents the step of selecting the "system management" menu, K2 represents the step of selecting the "task" sub-menu under the "system management" menu, K3 represents the step of selecting the "backup configuration/account data" task in the "task" sub-menu, K4 represents the step of inputting task name and pass code for the "backup configuration/account data" task, and K5 represents the step of selecting the configuration to be backed up for the "backup configuration/ account data" task.

Figure 4:
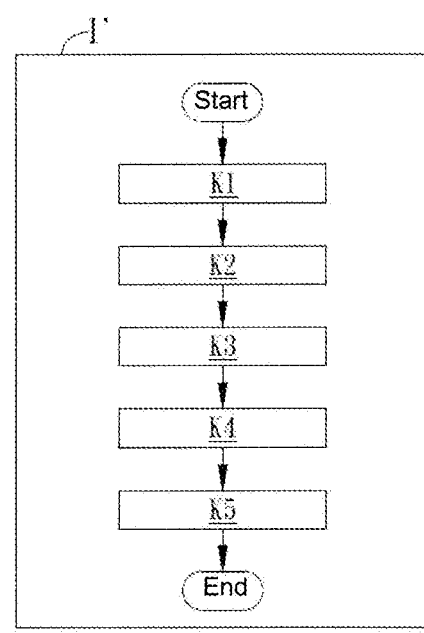
FIG. 4 is a diagram illustrating an operating instruction display, listing multiple operating steps, shown on the user interface of the remote management system.

The transmitting/receiving module 100 then transmits the operating instructions to the first computer 20, such that an operating instruction image I' of the multiple operating steps K1-K5 for performing/completing the configuration backup function are displayed on the screen of first computer 20, as shown in FIG. 4, to provide a reference to the user's operation. As such, the user can follow the operating steps K1-K5 as shown in the operating instruction image I', easily complete the function of configuration backup in a step-by-step manner.

Figure 5A:
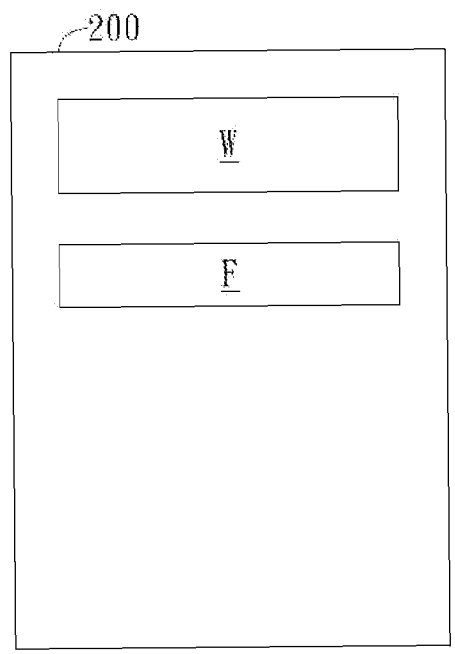
FIG. 5A is a diagram illustrating an input window shown on the monitor screen of a first computer.

In addition, the user interface provided by display screen of the first computer 20 can also include an input window. As shown in FIG. 5A, the screen display 200 of the first computer has an input window W so that a user may input a keyword in the input window W. The first computer can generate user instructions in response to the content inputted into the input window W. The display screen 200 of the first computer 20 can further display a candidate function that matches the keyword content.

It is noted that since the remote management apparatus 10 has synonyms or homonyms search function, the keyword content input by user in the input window W can either directly matches the name of a specific function, or synonymously or homonymously relates to the name of a specific function. In other word, the keyword content inputted by the user does not necessarily have to be an exact match of the name or code of a specific function. Rather, it can be synonymous or homonymous to the name or code of the specific function.

Figure 5B:
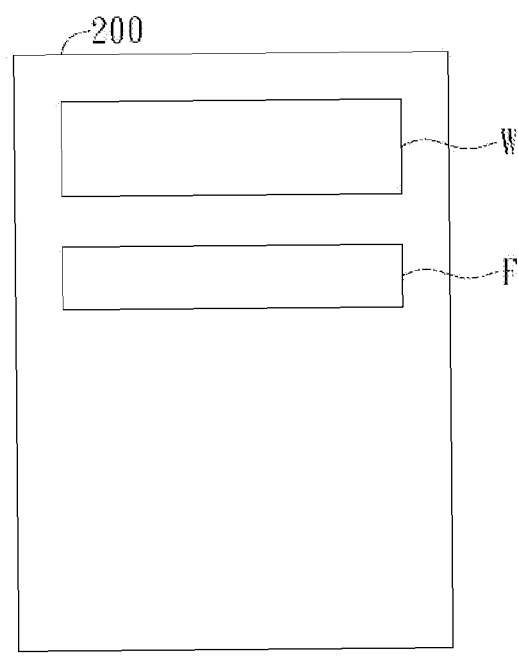
FIG. 5B is a diagram illustrating inputting a Chinese synonyms keyword in the input window.
Figure 5C:
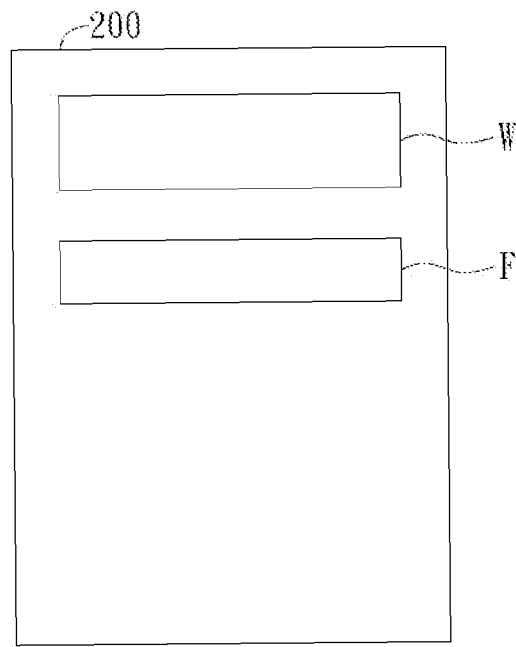
FIG. 5C is a diagram illustrating inputting an English synonyms keyword in the input window.

For example, as shown in FIGS. 5B and 5C, assuming the user wants to perform a configuration "restore" function, but inputs a synonymous Chinese or English word in the window W when inputting the keyword, the remote management apparatus 10 can still use its search function to find the correct computer configuration "restore" function, in response to the synonymous input. This search function for the homonymous keyword input operates similarly and so its description will not be repeated here.

Another preferred embodiment of the present invention is the operating method for the remote management system. In this embodiment, the remote management operating method is applied to a remote management system, wherein the remote management system can couple a first computer to a second computer through a network such that the first computer can operate the second computer. The remote management system includes at least a remote management apparatus and user interface. The remote management apparatus further include a control center and one or more over-IP apparatus. The remote management apparatus has a network interface, a computer interface and an console interface. The network interface is used to couple the first computer through the network, the computer interface is used as a signal transmission interface between the remote management apparatus and the second computer, and the console interface corresponds to a group of cursor control device and display screen.

Figure 6:
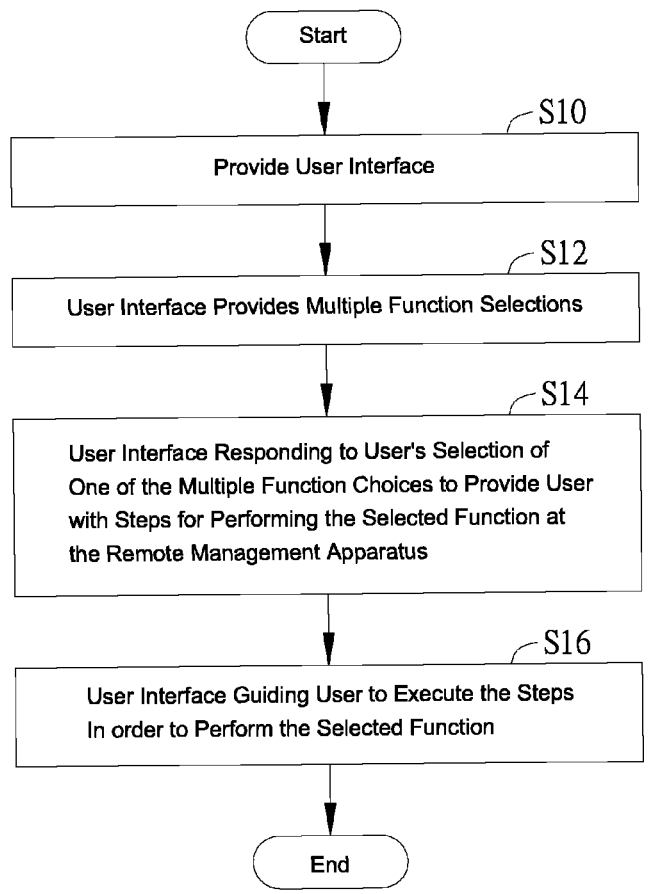
FIG. 6 is a flow chart diagram illustrating the process of one embodiment of the present invention remote management operating method.

Please refer to FIG. 6 which illustrates a process flow chart of the remote management operating method in accordance with this embodiment.

As shown in FIG. 6, in step S10, the present invention method provides a user interface. In fact, if the remote management system further includes an OSD module, then step S10 can provide an OSD of the user interface by the OSD module. In addition, remote management apparatus may interact with the first computer by using HTML to provide the user interface on the first computer.

In step S12, the user interface provides multiple function options, which respectively correspond to the multiple functions of the remote management apparatus. In step S14, the user interface provides, in response to the user's selection of one of the options, the steps to be executed by the remote management apparatus for performing the function that corresponds to the selected option. Then in step S16, the user interface guides the user to perform these steps in order to complete the selected function.

Figure 7:
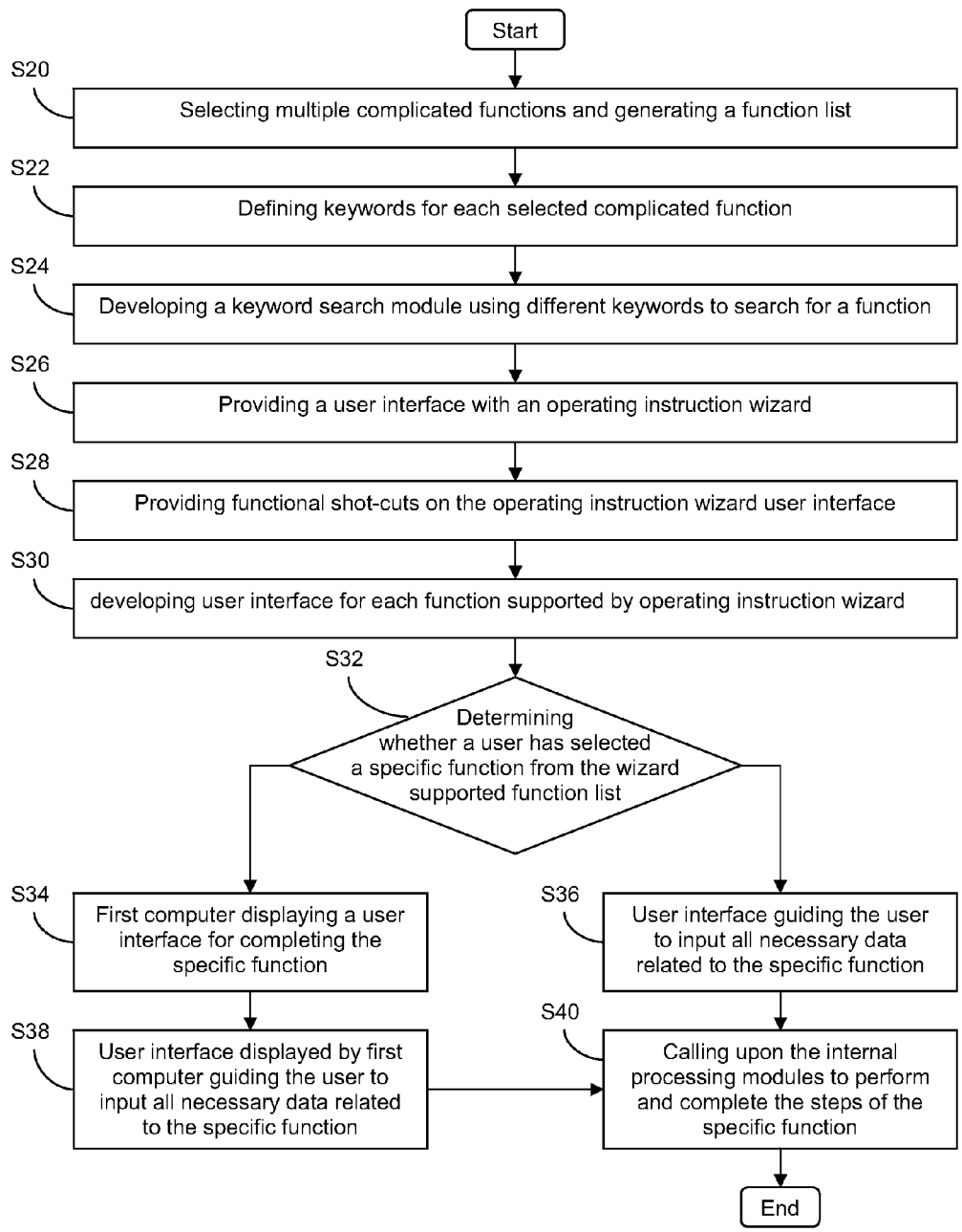
FIG. 7 is a flow chart diagram illustrating the process of another embodiment of the present invention remote management operating method.

Referring to FIG. 7, there is illustrated another embodiment of the operating method for the remote management system. The design process of the remote management system includes the following steps S20 to S30: First, in step S20, the process will select multiple relatively more complicated functions, and generate a function list. Next in step S22, the process will define keywords for each function. In fact, the keywords can include synonyms and homonyms of the name or code of the function and can even include synonyms and homonyms in different languages.

Thereafter in step S24, the process will develop a keyword search module that can use different keywords to search for a specific function. In step S26, the process provides a user interface with an operating instruction wizard. The operating instruction wizard user interface can be in the form of an HTML web-page, an OSD menu, or any other suitable forms, wherein the OSD menu directly displays the content and result set and modified by the user. In step S28, the process provides functional shot-cuts on the operating instruction wizard user interface. Last, in step S30, the process develops user interface for every function supported by the operating instruction wizard.

After the completion of the design process of the remote management system, the operation process of the remote management method includes the following steps S32 through S40: in step S32, the process determines whether a user has selected a specific function from the wizard supported function list. This may be done by determining whether the user has touched or pint-and-clicked on an option displayed on the screen of the first computer that corresponds to the specific function, or by determining whether the user can inputted the name or code or their synonyms or homonyms of the specific function, If the determination of step S32 is affirmative, i.e. the user has selected a specific function to be performed from the wizard supported function list, then step S34 is executed, where the first computer displays a user interface for completing the specific function (i.e., an operating instruction image showing all operating steps). Then in step S38, the user interface guides the user to input all necessary data related to the specific function.

If the determination of step S32 is negative, i.e. the user has selected a specific function not from the wizard supported function list, then step S36 is executed, whereupon the user interface guides the user to input all necessary data related to the specific function.

After step S38 or S36, in step S40 the process will call upon the internal processing modules to perform and complete the steps of the specific function.

Comparing to existing technologies, the present invention remote management system and operating method have many advantages. It provide a user with operating instructions for completing a specific function to be performed on a remote computer through a remote management system, where the user only needs to select the specific function from a function list, or input keyword for the specific function in an input window, and follow the operating instructions provided at the user interface. In addition, the present invention remote management system has a synonymous and homonymous keyword search function which allows a user to conveniently input keywords that are synonyms or homonyms of the name or code of the specific function, when the user is unsure of the exact name or code of the specific function.

Although examples of the preferred embodiments of the present invention system and method are shown and described in detail above, the present invention is not limited to the specifics described herein. It will be apparent to those skilled in the art that various modification and variations can be made in the system and method of the present invention without departing from the spirit or scope of the invention. Thus, it is intended that the present invention cover modifications and variations that come within the scope of the appended claims and their equivalents.

What is claimed is:

1. A remote management system capable of coupling a first computer to at least one second computer through a network such that the first computer can operate the at least one second computer, comprising:

an Internet protocol (IP)-based keyboard-video-mouse (KVM) switch apparatus having a network interface for coupling to the first computer through the network, and a computer interface for signal transmission between the IP-based KVM switch apparatus and the at least one second computer; and a user interface provided on the first computer for providing a plurality of function selection options that correspond respectively to a plurality of functions of the IP-based KVM switch apparatus, whereas the plurality of functions of the IP-based KVM switch apparatus are for controlling the at least one second computer, wherein the user interface further receives a search request from the user specifying a keyword, and in response to the search request, the user interface provides a candidate function that matches the keyword, wherein the candidate function is for controlling the at least one second computer and is a synonym or homonym of the keyword, and in response to a user selection of an option of the function selection options or a user selection of the candidate function, the user interface further providing a plurality of operating steps to be executed on the IP-based KVM switch apparatus for performing a specific function that corresponds to the user selected option, to guide the user to input all necessary data related to the specific function;

wherein the IP-based KVM switch apparatus executes the plurality of operating steps of the specific function that corresponds to the user selected option.

2. The system of claim 1, wherein the plurality of functions are selected from a group comprising a computer configuration backup function, a computer configuration restore function, a computer firmware upgrade function, and a user right administration function.

3. The system of claim 1, wherein the IP-based KVM switch apparatus further interacts with the first computer to provide the user interface on the first computer.

4. The system of claim 3, wherein the IP-based KVM switch apparatus uses hyper-text markup language (HTML) to interacts with the first computer.

5. A method for operating a remote management system, the remote management system capable of coupling a first computer to at least one second computer through a network, such that the first computer can operate the at least one second computer, and having an IP-based KVM switch apparatus that has a network interface for coupling to the first computer through the network, and a computer interface for signal transmission between the remote management apparatus and the at least one second computer, the method comprising the steps of:

providing a user interface on the first computer for providing a plurality of function selection options that correspond respectively to a plurality of functions of the IP-based KVM switch apparatus, whereas the plurality of functions of the IP-based KVM switch apparatus are for controlling the at least one second computer, wherein the user interface further receives a search request from the user specifying a keyword, and in response to the search request, the user interface provides a candidate function that matches the keyword, wherein the candidate function is for controlling the at least one second computer and is a synonym or homonym of the keyword;

in response to a user selection of an option of the function selection options or a user selection of the candidate function, further providing a plurality of operating steps to be executed on the IP-based KVM switch apparatus for performing a specific function that corresponds to the user selected option, and guiding the user to input all necessary data related to the specific function; and executing the plurality of operating steps of the specific function that corresponds to the user selected option.

6. The method of claim 5, wherein the plurality of functions are selected from a group comprising a computer configuration backup function, a computer configuration restore function, a computer firmware upgrade function, and a user right administration function.

7. The method of claim 6, wherein the IP-based KVM switch apparatus further interacts with the first computer to provide the user interface on the first computer.

8. The method of claim 7, wherein the IP-based KVM switch apparatus uses hyper-text markup language (HTML) to interacts with the first computer.

* * * * *